(12) United States Patent
McJunkin (10) Patent No.: US 7,731,255 B2
(45) Date of Patent: Jun. 8, 2010

(54) INTERIOR VEHICLE CARGO SYSTEM

(75) Inventor: James G. McJunkin, Chula Vista, CA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 584 days.

(21) Appl. No.: 11/733,497

(22) Filed: Apr. 10, 2007

(65) Prior Publication Data

US 2008/0253857 A1   Oct. 16, 2008

(51) Int. Cl.
  *B60P 7/135* (2006.01)
(52) U.S. Cl. ..................... 296/24.4; 410/130
(58) Field of Classification Search ............... 296/24.4, 296/37.1, 37.6, 37.16; 410/117, 118, 129, 410/130, 132
  See application file for complete search history.

(56) References Cited

U.S. PATENT DOCUMENTS

| | | | |
|---|---|---|---|
| 3,217,664 A * | 11/1965 | Aquino et al. ............... 410/131 |
| 4,049,311 A * | 9/1977 | Dietrich et al. ............. 410/138 |
| 4,621,856 A | 11/1986 | McKenzie | |
| 4,639,031 A * | 1/1987 | Truckenbrodt ........... 296/24.41 |
| 4,688,842 A | 8/1987 | Arbenius | |
| 4,938,518 A * | 7/1990 | Willemsen ................ 296/24.41 |
| 5,382,068 A * | 1/1995 | Simmons et al. .......... 296/24.41 |
| 6,357,979 B1 | 3/2002 | Montagna et al. | |
| 6,547,298 B2 | 4/2003 | Sotiroff et al. | |
| 6,550,849 B1 * | 4/2003 | Dosdall .................... 296/183.1 |
| 6,789,830 B2 * | 9/2004 | Van Bussel .............. 296/26.09 |
| 6,893,080 B2 * | 5/2005 | Hashimoto ............. 296/190.11 |
| 6,923,610 B2 * | 8/2005 | Nelson et al. ................ 410/130 |
| 6,971,828 B2 | 12/2005 | Bernardo | |
| 6,974,170 B2 | 12/2005 | Mulvihill | |
| 7,393,034 B2 * | 7/2008 | Brussard et al. .......... 296/24.41 |
| 2003/0057724 A1 | 3/2003 | Inagaki et al. | |
| 2003/0141731 A1 * | 7/2003 | Betts et al. ................. 296/24.1 |

* cited by examiner

*Primary Examiner*—H Gutman
(74) *Attorney, Agent, or Firm*—Global IP Counselors, LLP (57) ABSTRACT

An interior vehicle cargo system is provided with an interior cargo structure, bulkhead and a bulkhead attachment assembly. The bulkhead attachment assembly selectively retains the bulkhead in one of a plurality of locations within interior cargo area. The bulkhead attachment assembly includes at least a pair of elongated tracks and at least one fastening structure associated with each of the elongated tracks. One of the elongated tracks is attached to a first one of the vehicle panels, while another elongated track is attached to a second one of the vehicle panels that is opposite the first one of the vehicle panels. The fastening structures are slideably arranged on the elongated tracks to selectively fastening the bulkhead at one of the plurality of locations.

16 Claims, 6 Drawing Sheets

INTERIOR VEHICLE CARGO SYSTEM

BACKGROUND OF THE INVENTION

1. Field of the Invention

The present invention generally relates to an interior vehicle cargo system dividing an interior area of a vehicle. More specifically, the present invention relates to an interior vehicle cargo system that is adjustable in a longitudinal direction of the vehicle.

2. Background Information

Typically, a standard cargo van or vehicle has a large undivided cargo area that is very useful for loading large items. In other words, the cargo area is usually little more than a large empty volume. However, with such a large space, small items can move around when driving. Thus, some cargo vans include several tie-down points scattered along the perimeter of its interior walls to help secure items from moving during driving. Also these standard cargo vans or vehicles are typically open to the driver so that the driver can access the cargo area without exiting the vehicle.

While the large cargo area and the easy access to cargo area are advantageous at certain times, they can also be very disadvantageous at times. Accordingly, various accessories have been offered to allow customization of the cargo area to suit a particular need. Currently, bulkhead dividers have been proposed for isolating the driver from the cargo area. One example of a bulkhead divider for a cargo van is disclosed in U.S. Pat. No. 6,357,979 to Montagna et al. However, with this type of bulkhead divider, the divider is secured to the vehicle such that it is difficult to easy change the position of the divider in the cargo area. Thus, others have proposed movable bulkhead dividers. Examples of movable bulkhead dividers are disclosed in U.S. Pat. No. 4,621,856 to McKenzie; and U.S. Pat. No. 6,547,298 to Sotiroff et al. While these systems are at least partially effective, they are not necessarily designed to interface with the cargo van in an optimum manner from a functional, structural and aesthetic standpoint.

In view of the above, it will be apparent to those skilled in the art from this disclosure that there exists a need for an improved interior vehicle cargo system. This invention addresses this need in the art as well as other needs, which will become apparent to those skilled in the art from this disclosure.

SUMMARY OF THE INVENTION

One object of the present invention is to provide an interior vehicle cargo system that is easily adjustable.

The foregoing object can basically be attained by providing an interior vehicle cargo system that basically comprises an interior cargo structure, bulkhead and a bulkhead attachment assembly. The interior cargo structure includes a lower vehicle panel, a first side vehicle panel, a second side vehicle panel and an upper vehicle panel defining a vertical cross sectional area. The bulkhead is movably positioned within the interior cargo area. The bulkhead includes first and second side surfaces defined by a lower bulkhead edge, a first side bulkhead edge, a second side bulkhead edge and an upper bulkhead edge. The bulkhead attachment assembly selectively retains the bulkhead in one of a plurality of locations within interior cargo area. The bulkhead attachment assembly includes a first elongated track, a first fastening structure, a second elongated track and a second fastening structure. The first elongated track is attached to a first one of the vehicle panels. The first fastening structure is slideably arranged on the first elongated track to selectively fastening a first one of the bulkhead, edges to the first elongated track at one of the plurality of locations. The second elongated track is attached to a second one of the vehicle panels that is opposite the first one of the vehicle panels. The second fastening structure is slideably arranged on the second elongated track to selectively fastening a second one of the bulkhead edges to the second elongated track at one of the plurality of locations.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
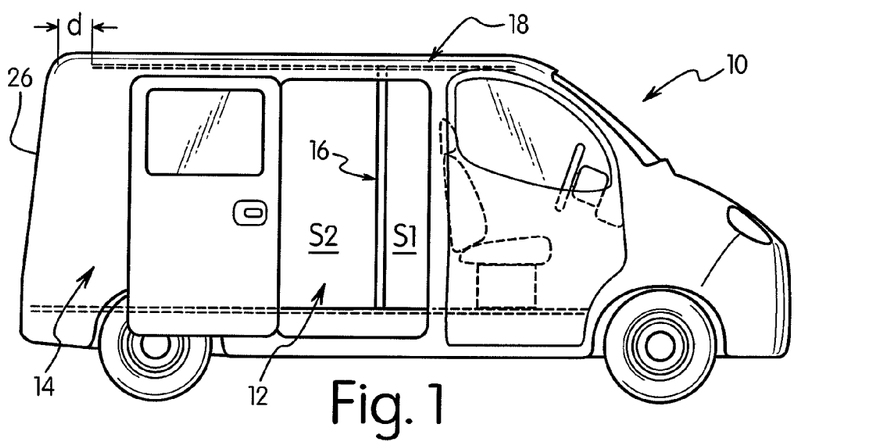
FIG. 1 is a side elevational view of a cargo van or vehicle that is equipped with an interior vehicle cargo system in accordance with the present invention.
Figure 2:
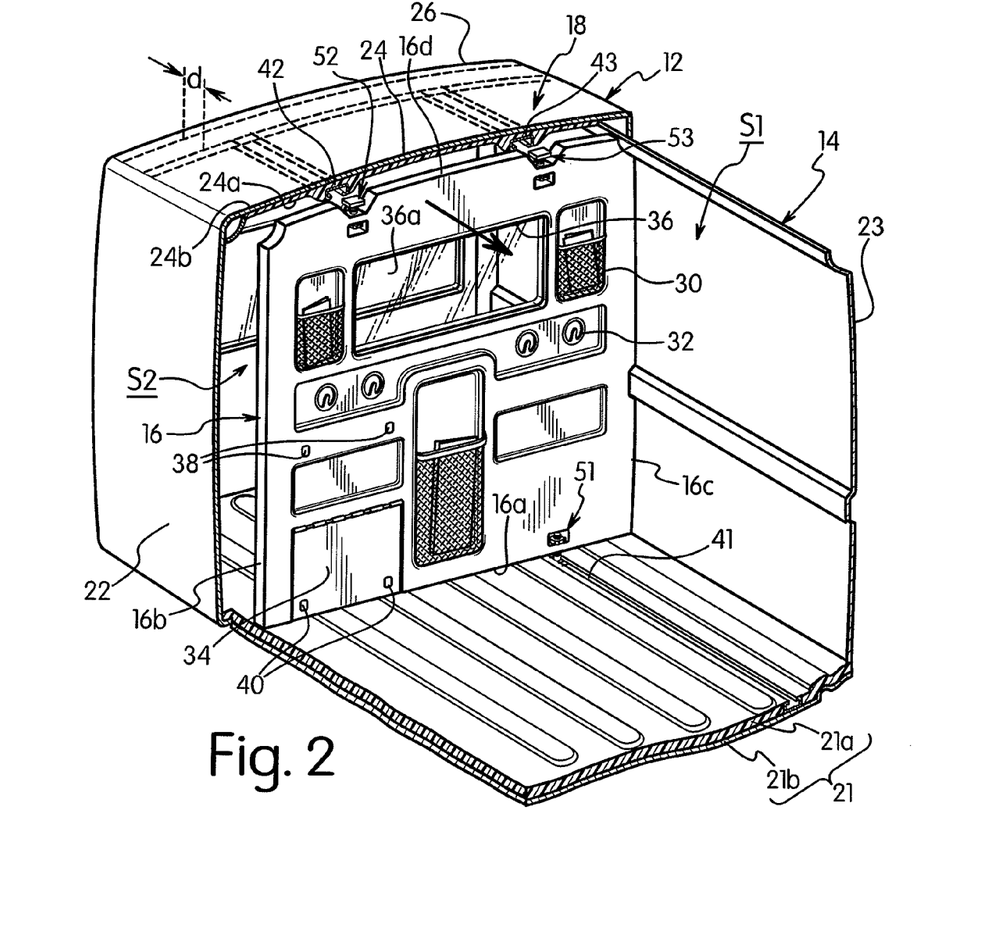
FIG. 2 is a simplified fragmentary perspective view of the interior vehicle cargo system in accordance with a first embodiment of the present invention with the bulkhead in a first position.
Figure 3:
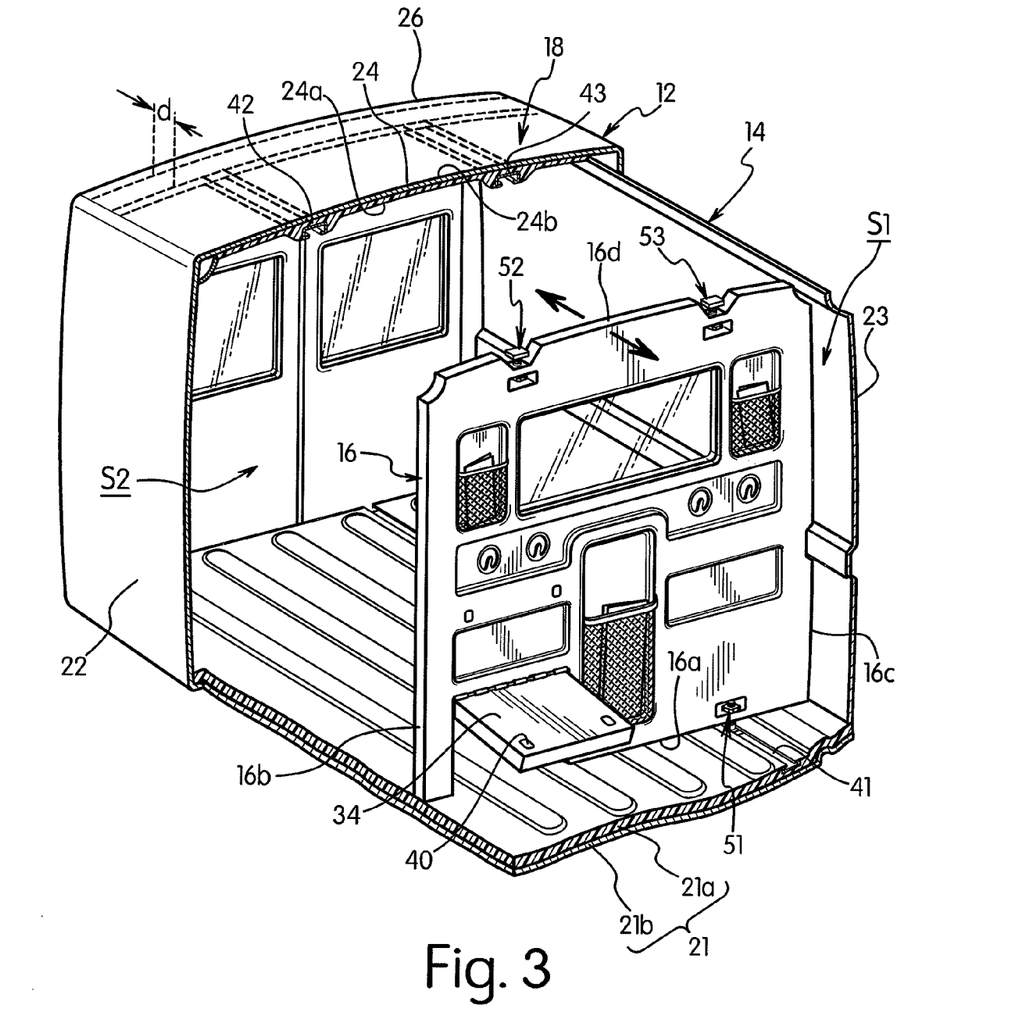
FIG. 3 is a simplified fragmentary perspective view of the interior vehicle cargo system illustrated in FIG. 2 with the bulkhead in a second position.

Referring initially to FIGS. 1 and 2, a vehicle 10 is illustrated that is equipped with an interior vehicle cargo system 12 in accordance with a first embodiment of the present invention. The interior vehicle cargo system 12 basically includes an interior cargo structure 14 of the vehicle 10, a movable bulkhead 16 and a bulkhead attachment assembly 18. The movable bulkhead 16 is reconfigurable in the interior cargo structure 14 of the vehicle 10 such that the interior area of the interior cargo structure 14 can be selectively divided into two different concealed interior spaces S1 and S2.

Basically, the interior cargo structure 14 includes a lower vehicle panel 21, a first side vehicle panel 22, a second side vehicle panel 23 and an upper vehicle panel 24. In the illustrated embodiment, the panels form a rectangular box like structure. Thus, the interior cargo structure 14 has a vertical cross sectional area with a rectangular shape that is slightly larger than the outer periphery of the bulkhead 16. In the illustrated embodiment, the lower vehicle panel 21 and the upper vehicle panel 24 are provided with hard plastic interior panels 21a and 24a that overlies the sheet metal panels 21b and 24b of the lower vehicle panel 21 and the upper vehicle panel 24, respectively. These hard plastic interior panels 21a and 24a allows the interior vehicle cargo system 12 to be retrofitted to existing vehicles. Preferably, the upper vehicle panel 24 is spaced from a rear wall 26 of the vehicle 10 by an installation gap "d" so that the bulkhead 16 can be easily installed and removed from the vehicle 10.

The bulkhead 16 is rigid member that is self supporting. The bulkhead 16 can be made of a variety of materials. For example, the main body of the bulkhead 16 can be constructed out of primarily non-metallic materials such as a blow molded plastic or a foam body that is coated with a hard shell with accessories partially embedded therein. The bulkhead 16 is movably positioned within the interior cargo area to divide the interior cargo area into the first and second interior spaces S1 and S2. The bulkhead 16 includes first and second side surfaces that are defined by a lower bulkhead edge 16a, a first side bulkhead edge 16b, a second side bulkhead edge 16c and an upper bulkhead edge 16d. The bulkhead is dimensioned slightly smaller that the overall vertical cross sectional area of the interior cargo structure. Preferably, the periphery of the bulkhead 16, as defined by edges 16a to 16d, is shaped to closely mate with the panels 21 to 24. In other words, the overall shape of the bulkhead 16 closely matches the vertical cross sectional area of the interior cargo area.

Figure 4:
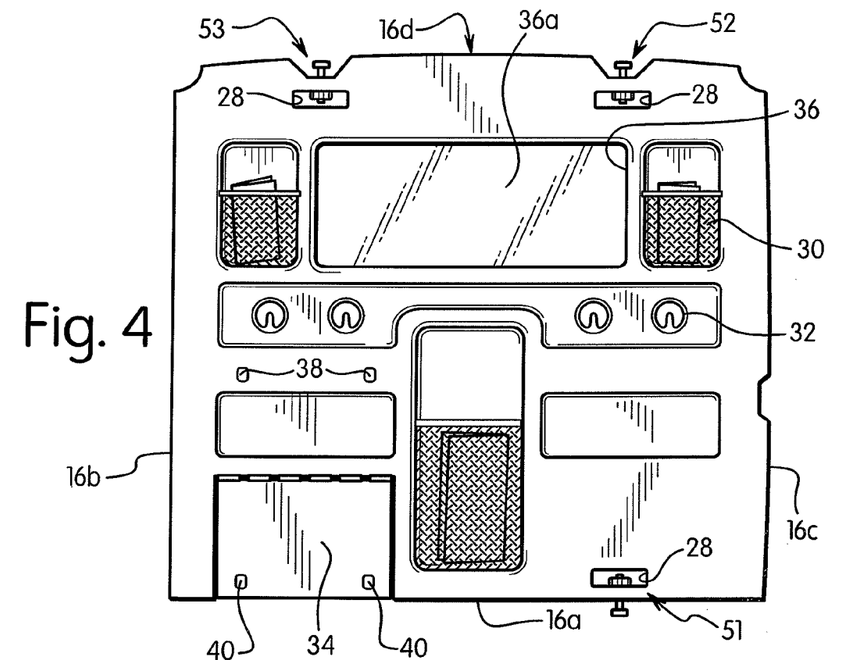
FIG. 4 is a front side elevational view of the bulkhead for the interior vehicle cargo system illustrated in FIGS. 2 and 3.
Figure 5:
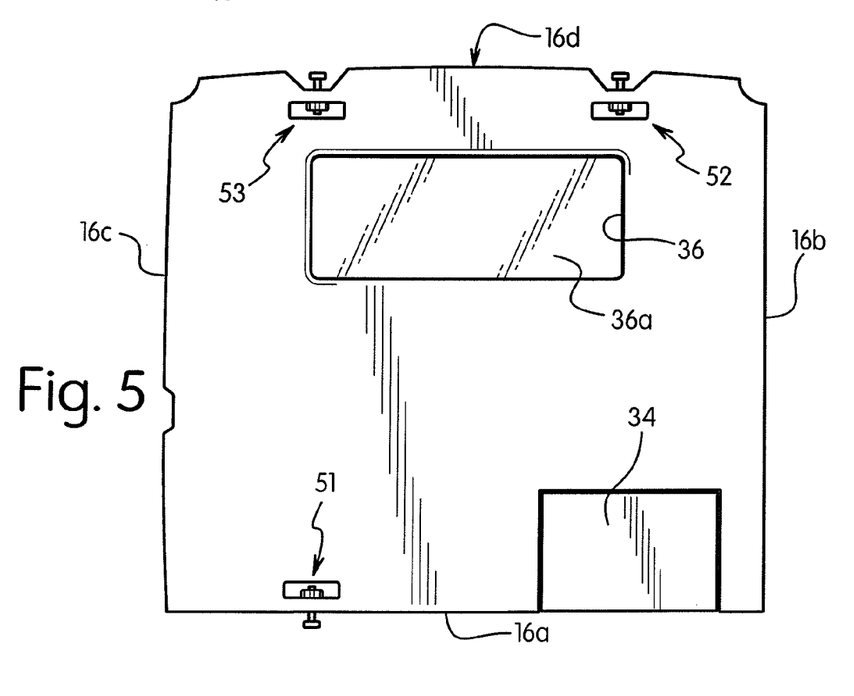
FIG. 5 is a rear side elevational view of the bulkhead for the interior vehicle cargo system illustrated in FIGS. 2 to 4.

As best seen in FIGS. 4 and 5, the bulkhead 16 has three mounting apertures 28 extending between the first and second side surfaces of the bulkhead 16 with parts of the bulkhead attachment assembly 18 being mounted in these mounting apertures 28 to selectively release and secure the bulkhead 16 to the panels 21 to 24. These mounting apertures 28 are configured and arranged so that the bulkhead attachment assembly 18 can be easily accessed from either of the first and second interior spaces S1 and S2.

As illustrated in FIG. 4, the front side of the bulkhead 16 is provided with a plurality of cargo nets 30 and a plurality of cargo hooks 32. While the rear side of the bulkhead 16 is illustrated in FIG. 5 as not including cargo nets or cargo hooks, it will be apparent to those skilled in the art from this disclosure that rear side of the bulkhead 16 can include cargo nets or cargo hooks, as needed and/or desired.

Preferably, the bulkhead 16 includes a lower swinging door 34 that at least partially forms the lower bulkhead edge 16a when the door 34 is in a closed position. Preferably, the door 34 swings in both directions and is lockable from the front side. The door 34 allows for long objects to extend between the first and second interior spaces S1 and S2 and lie flat on the lower vehicle panel 21. In order to hold the door 34 in the open position, the bulkhead 16 is provided with a pair of magnets 38 and the door is provided with a corresponding pair of metal latch plates 40. Alternatively, other types of fastening devices can be used such as hook and loop fasteners, a lockable latch, etc. In addition, a similar fastening arrangement can be used to hold the door 34 in the closed position. Also the bulkhead 16 preferably includes an upper section with an upper window aperture 36 that extends a majority of a lateral width of the bulkhead 16 as measured between the first and second side bulkhead edge 16b and 16c. In the illustrated embodiment, a transparent panel 36a is disposed in the upper window aperture 36. However, the upper window aperture 36 can be merely an opening or a wire mesh as needed and/or desired.

As mentioned above, the bulkhead attachment assembly 18 selectively retains the bulkhead 16 in one of a plurality of locations within interior cargo area. The bulkhead attachment assembly 18 basically includes a stationary part attached to the interior cargo structure 14 and a movable part attached to the bulkhead 16 to move therewith.

The stationary part of the bulkhead attachment assembly 18 basically includes a first elongated track 41, a second elongated track 42 and a third elongated track 43. The first elongated track 41 is attached to the lower vehicle panel 21. The second elongated track 42 is attached to the upper vehicle panel 24 that is opposite the lower vehicle panel 21. The third elongated track 43 is also attached the upper vehicle panel 24 that is opposite the lower vehicle panel 21. Each of the elongated tracks 41 to 43 has a generally transverse C-shaped cross section that open towards the interior of the vehicle 10. The tracks 32 are preferably constructed of a hard rigid material such as metal. The elongated tracks 41 to 43 are structurally identical to each other, but the elongated tracks 42 and 43 are mounted as mirror images of the elongated track 41. The first elongated track 41 is flushly mounted with respect to adjacent interior surface of the lower vehicle panel 21, while the elongated tracks 42 and 43 are flushly mounted with respect to adjacent interior surface of the upper vehicle panel 24. More specifically, the first elongated track 41 is embedded into the interior panel 21a, while the elongated tracks 42 and 43 are embedded into the interior panel 24a such that the elongated tracks 41 to 43 do not protrude into the interior of the vehicle 10. Alternatively, the interior panels 21a and 24a can be eliminated and the elongated tracks 41 to 43 can be directly attached to the sheet metal body panels 21b and 24b of the vehicle 10.

The movable part of the bulkhead attachment assembly 18 basically includes a first fastening structure 51, a second fastening structure 52 and a third fastening structure 53. The first fastening structure 51 is slideably arranged on the first elongated track 41 to selectively fasten the lower bulkhead edge 16a of the bulkhead 16 to the first elongated track 41 at one of the plurality of locations along the longitudinal length of the lower vehicle panel 21. The second fastening structure 52 is slideably arranged on the second elongated track 42 to selectively fasten the upper bulkhead edge 16d of the bulkhead 16 to the second elongated track 42 at one of the plurality of locations along the longitudinal length of the upper vehicle panel 24. The third fastening structure 53 is slideably arranged on the third elongated track 43 to selectively fasten the upper bulkhead edge 16d of the bulkhead 16 to the third elongated track 43 at one of the plurality of locations along the longitudinal length of the upper vehicle panel 24.

Figure 6:
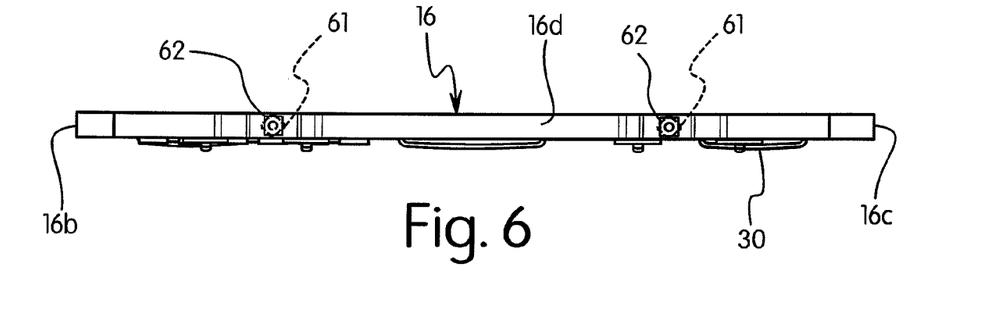
FIG. 6 is a bottom plan view of the bulkhead for the interior vehicle cargo system illustrated in FIGS. 2 to 5.

Preferably, the fastening structures 51 to 53 are identical to each other, except for their orientations. Thus, the identical parts of the fastening structures 51 to 53 will be given the same reference numbers. Each of the fastening structures 51 to 53 includes an operating member 61 at least partially disposed within the bulkhead 16 and a securing member 62 slideably disposed in a corresponding one of the elongated tracks 41 to 43 to releasably secure the bulkhead 16 to the corresponding one of the elongated tracks 41 to 43. As seen in FIG. 6, the operating members 61 are recessed inwardly from the first and second side surfaces the bulkhead 16. Basically, the operating member 61 is a knob with a center threaded bore and the securing member 62 is a bolt with a head located in one of the one of the elongated tracks 41 to 43 and a thread shaft that threadedly engages the threaded bore of the operating member 61. The operating members 61 are accessible from each of the first and second interior spaces S1 and S2 through the mounting apertures 28 to be operated between a secured position and a released position.

Now, one possible installation method will be discuss for installing the interior vehicle cargo system 12 into the interior cargo structure 14 of the vehicle 10. The fastening structures 51 to 53 are first attached to the bulkhead 16 such that the operating members 61 are located in the mounting apertures 28 with the securing member 62 extending outwardly from the periphery of the bulkhead 16. Thus, the bulkhead 16 has internal passageways extending from the mounting apertures 28 to the adjacent edge of the bulkhead 16 for receiving the thread shafts of the securing members 62.

Figure 7:
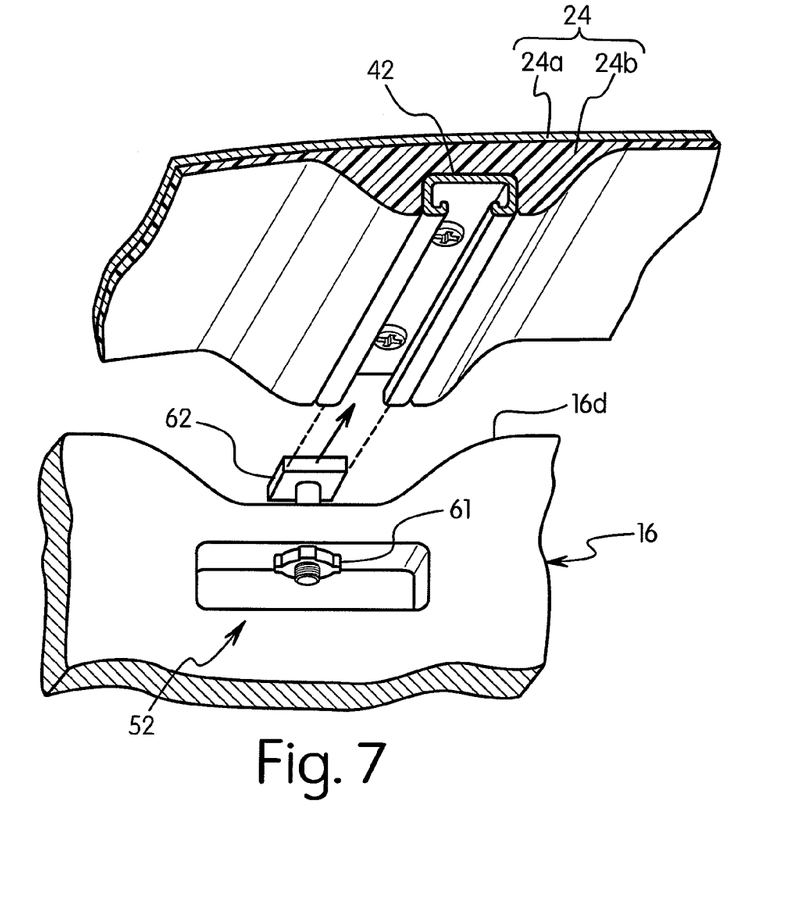
FIG. 7 is an exploded fragmentary perspective view of the connection between the upper vehicle panel and the upper bulkhead edge of the bulkhead.
Figure 8:
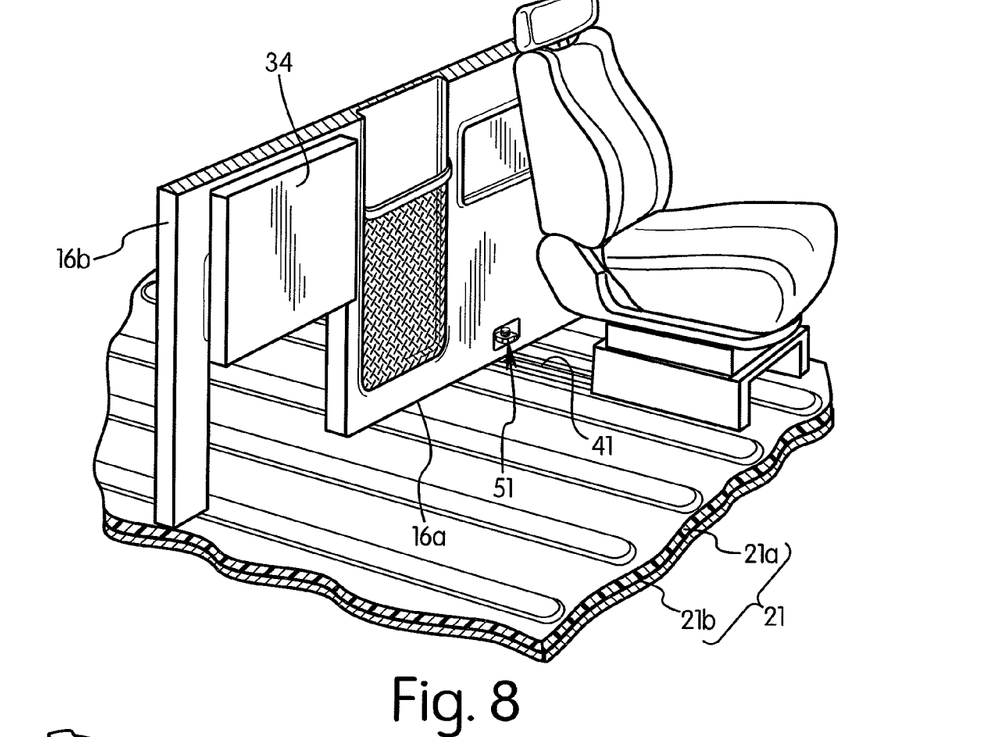
FIG. 8 is a simplified fragmentary perspective view of the interior vehicle cargo system illustrated in FIGS. 2 to 7.
Figure 9:
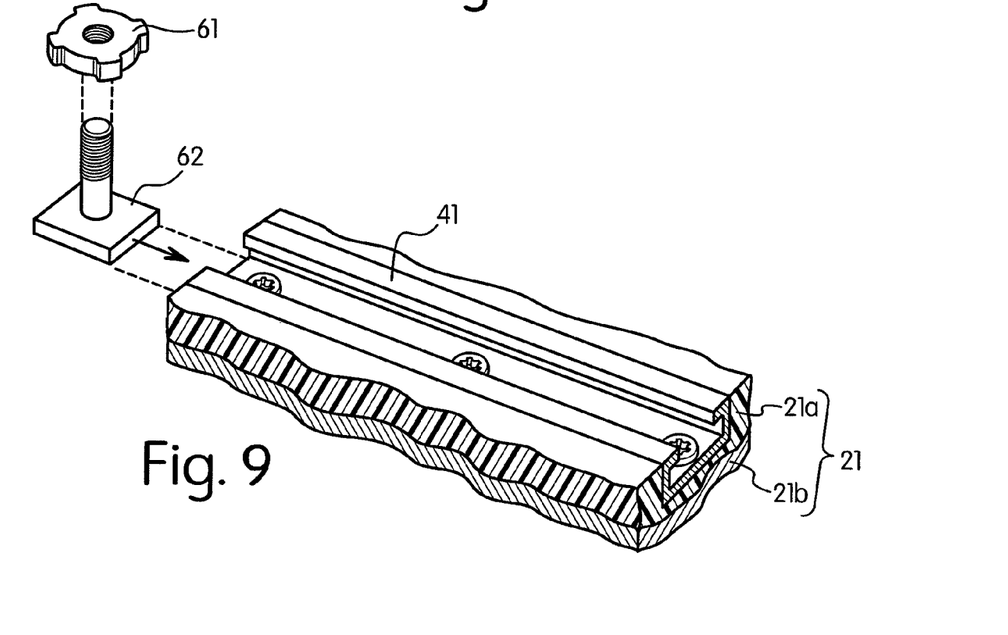
FIG. 9 is an exploded fragmentary perspective view of the connection between the lower vehicle panel and the lower bulkhead edge of the bulkhead.

Next, the bulkhead 16 is inserted through the rear doorway into the cargo area such that the securing members 62 are slide into the open rear ends of the elongated tracks 41 to 43 (e.g., see FIGS. 7 and 9). Now, the securing members 62 with the securing members 62 in the elongated tracks 41 to 43, the bulkhead 16 can be moved longitudinally within the cargo area to any desired location. Once the desired location has been established, the operating members 61 are rotated to cause the securing members 62 to clamp against the elongated tracks 41 to 43. Thus, the bulkhead 16 is secured in the desired location.

Second Embodiment

Figure 10:
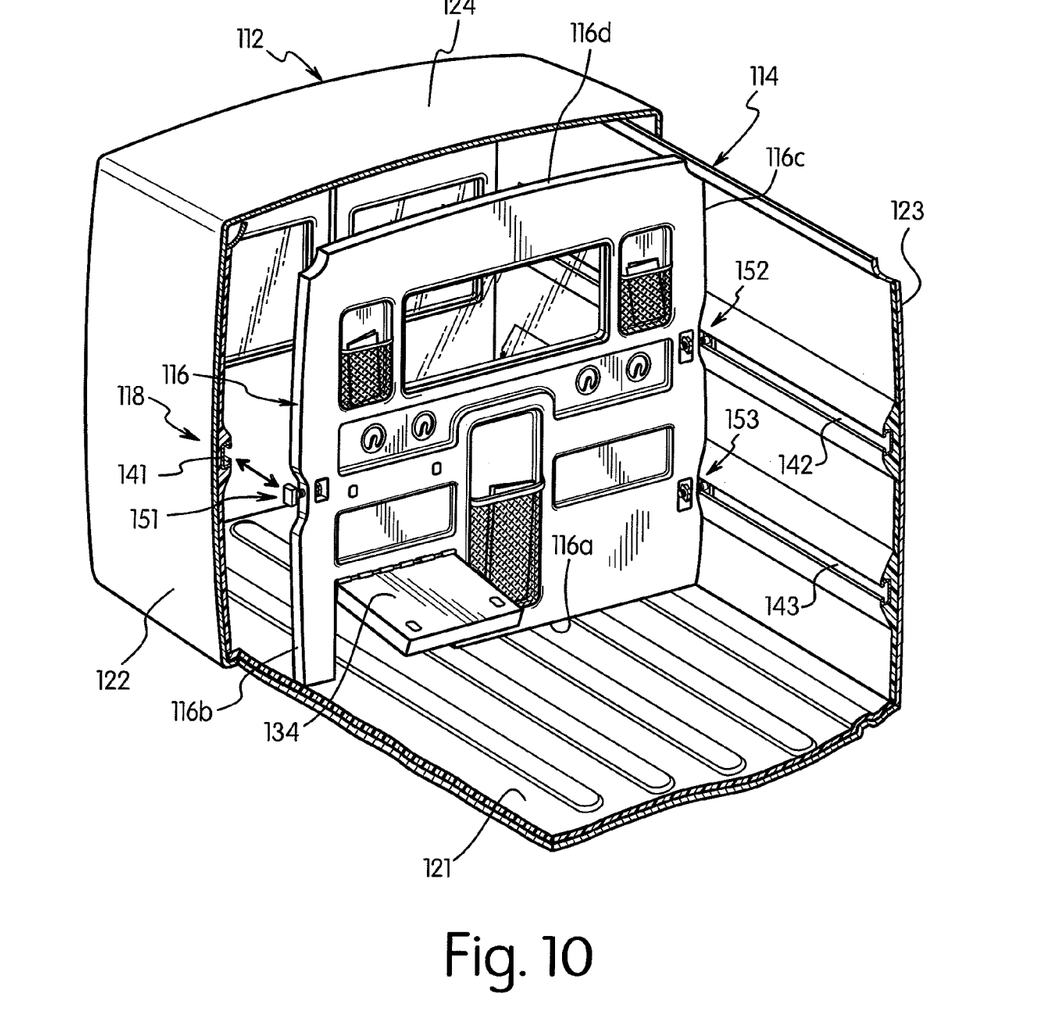
FIG. 10 is a simplified fragmentary perspective view of an interior vehicle cargo system illustrated in FIGS. 2 to 7 in accordance with a first embodiment of the present invention.

Referring now to FIG. 10, a modified interior vehicle cargo system 12 is illustrated in accordance with a second embodiment. The interior vehicle cargo system 112 basically includes an interior cargo structure 114, a movable bulkhead 116 and a bulkhead attachment assembly 118. Basically, the interior vehicle cargo system 112 is identically to the interior vehicle cargo system 12, except for the location of the bulkhead attachment assembly 118. In view of the similarity between the first and second embodiments, the descriptions of the parts of the second embodiment that are identical to the parts of the first embodiment may be omitted for the sake of brevity.

Basically, the interior cargo structure 114 includes a lower vehicle panel 121, a first side vehicle panel 122, a second side vehicle panel 123 and an upper vehicle panel 124. In the illustrated embodiment, the panels form a rectangular box like structure. The bulkhead 116 includes first and second side surfaces that are defined by a lower bulkhead edge 116a, a first side bulkhead edge 116b, a second side bulkhead edge 116c and an upper bulkhead edge 116d. The bulkhead is dimensioned slightly smaller that the overall vertical cross sectional area of the interior cargo structure. Preferably, the bulkhead 116 includes all of the features of the bulkhead 16, such as a lower swinging door 234.

Same as the first embodiment, the bulkhead attachment assembly 118 selectively retains the bulkhead 116 in one of a plurality of locations within interior cargo area. The bulkhead attachment assembly 118 basically includes a stationary part attached to the interior cargo structure 114 and a movable part attached to the bulkhead 116 to move therewith. The stationary part of the bulkhead attachment assembly 118 basically includes a first elongated track 141, a second elongated track 142 and a third elongated track 143. The first elongated track 141 is attached to the side vehicle panel 122, while the second and third elongated tracks 142 and 143 are attached to the side vehicle panel 123.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An interior vehicle cargo system comprising:
an interior cargo structure including a lower vehicle panel, a first side vehicle panel, a second side vehicle panel and an upper vehicle panel defining a vertical cross sectional area;
a bulkhead movably positioned within an interior cargo area and dividing the interior cargo area into first and second interior spaces, the bulkhead including first and second side surfaces defined by a lower bulkhead edge, a first side bulkhead edge, a second side bulkhead edge and an upper bulkhead edge, the first and second side surfaces facing in opposite directions of the interior cargo area with the first side surface defining an end wall of the first interior space and the second side surface defining an end wall of the second interior space; and
a bulkhead attachment assembly selectively retaining the bulkhead in one of a plurality of locations within the interior cargo area, the bulkhead attachment assembly including
a first elongated track attached to a first one of the vehicle panels,
a first fastening structure slideably arranged on the first elongated track to selectively fasten a first one of the bulkhead edges to the first elongated track at one of the plurality of locations, a second elongated track attached to a second one of the vehicle panels that is opposite the first one of the vehicle panels, and a second fastening structure slideably arranged on the second elongated track to selectively fasten a second one of the bulkhead edges to the second elongated track at one of the plurality of locations, with each of the first and second fastening structures being accessible from each of the first and second interior spaces to be operated between a secured position and a released position.

2. The interior vehicle cargo system according to claim 1, wherein the first and second elongated tracks are secured to the lower and upper vehicle panels, respectively.

3. The interior vehicle cargo system according to claim 1, wherein
the first and second elongated tracks are secured to the first and second side vehicle panels, respectively.

4. The interior vehicle cargo system according to claim 1, wherein
the bulkhead attachment assembly further includes a third elongated track attached to the first one of the vehicle panels, and a third fastening structure selectively fastening the first one of the edges of the bulkhead to the third elongated track at one of the plurality of locations.

5. The interior vehicle cargo system according to claim 1, wherein
each of the first and second fastening structures includes an operating member at least partially disposed within the bulkhead and a securing member disposed in a corresponding one of the first and second elongated tracks to releasably secure the bulkhead to the first and second elongated tracks.

6. The interior vehicle cargo system according to claim 5, wherein
the operating members are recessed inwardly from the first and second side surfaces of the bulkhead.

7. The interior vehicle cargo system according to claim 1, wherein
the bulkhead has a first mounting aperture extending between the first and second side surfaces of the bulkhead with an operating portion of the first fastening structure being exposed by the first mounting aperture, and a second mounting aperture extending between the first and second side surfaces of the bulkhead with an operating portion of the second fastening structure being exposed by the second mounting aperture.

8. The interior vehicle cargo system according to claim 1, wherein
the first and second elongated tracks are flushly mounted with respect to adjacent interior surfaces of the first and second ones of the vehicle panels.

9. The interior vehicle cargo system according to claim 1, wherein
the bulkhead includes a door that at least partially forms the lower bulkhead edge when the door is in a closed position.

10. The interior vehicle cargo system according to claim 1, wherein
the bulkhead includes at least one cargo hook disposed on at least one of the first and second side surfaces of the bulkhead.

11. The interior vehicle cargo system according to claim 1, wherein
the bulkhead includes an upper section with an upper window aperture that extends a majority of a lateral width of the bulkhead as measured between the first and second side bulkhead edges.

12. The interior vehicle cargo system according to claim 1, wherein
the bulkhead includes at least one cargo net disposed on at least one of the first and second side surfaces of the bulkhead.

13. The interior vehicle cargo system according to claim 1, wherein
the bulkhead is dimensioned slightly smaller than the overall vertical cross sectional area of the interior cargo structure.

14. The interior vehicle cargo system according to claim 13, wherein
the bulkhead attachment assembly further includes a third elongated track attached to the first one of the vehicle panels, and a third fastening structure selectively fastening the first one of the edges of the bulkhead to the third elongated track at one of the plurality of locations.

15. The interior vehicle cargo system according to claim 13, wherein
each of the first and second fastening structures includes an operating member at least partially disposed within the bulkhead and a securing member disposed in a corresponding one of the first and second elongated tracks to releasably secure the bulkhead to the first and second elongated tracks.

16. The interior vehicle cargo system according to claim 15, wherein
the operating members are recessed inwardly from the first and second side surfaces of the bulkhead.

* * * * *